W. C. NICHOLSON.
FLEXIBLE METALLIC TIRE.
APPLICATION FILED SEPT. 29, 1910.
994,651.
Patented June 6, 1911.
2 SHEETS—SHEET 1.
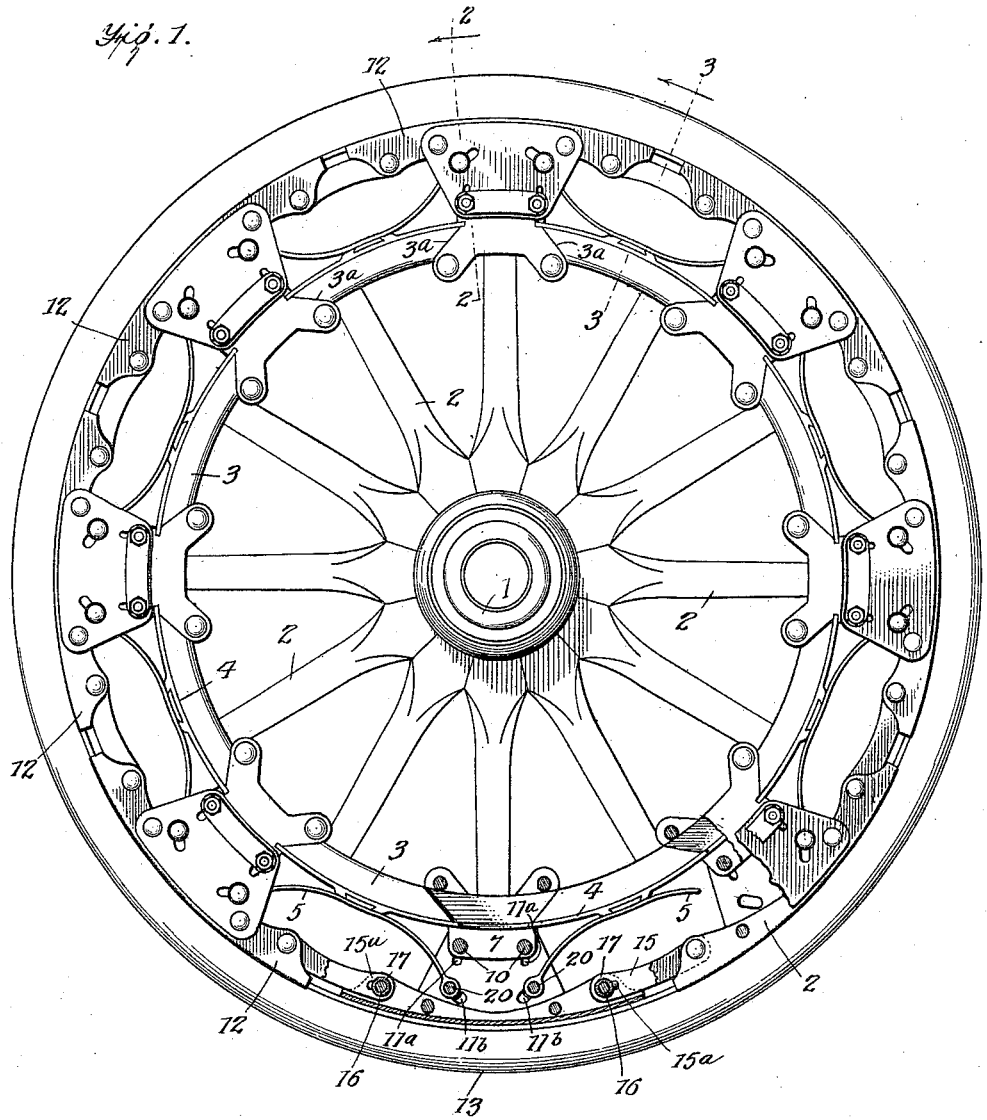
WITNESSES:
INVENTOR
WILLIAM C. NICHOLSON,
BY
ATTORNEYS W. C. NICHOLSON.
FLEXIBLE METALLIC TIRE.
APPLICATION FILED SEPT. 29, 1910.
994,651.
Patented June 6, 1911.
2 SHEETS—SHEET 2.
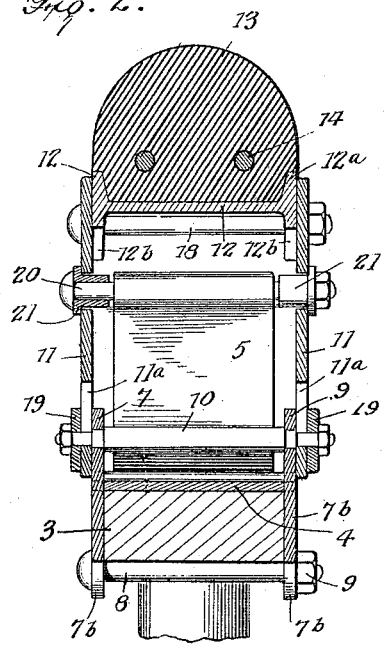
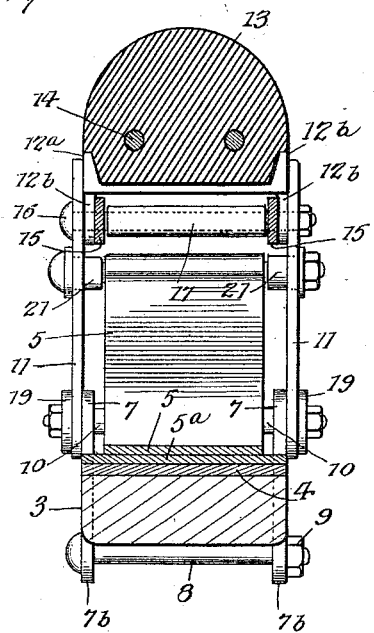
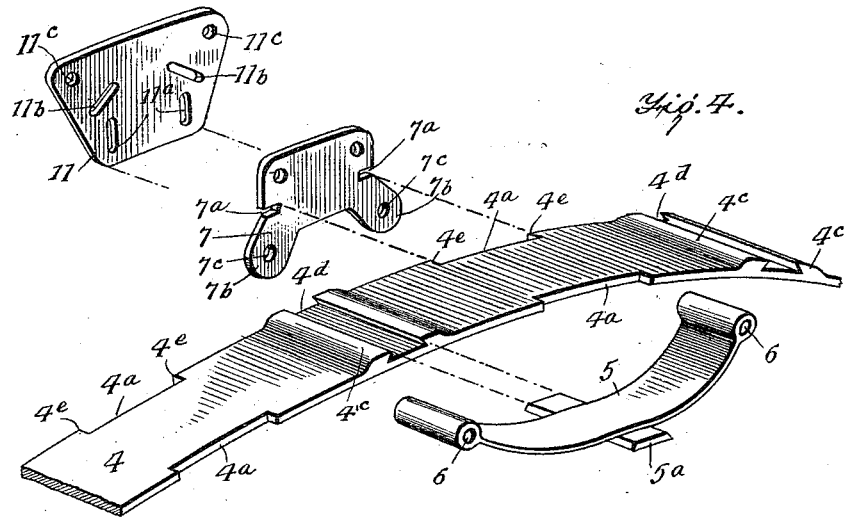
WITNESSES:
INVENTOR
WILLIAM C. NICHOLSON,
BY
ATTORNEYS

UNITED STATES PATENT OFFICE.

WILLIAM C. NICHOLSON, OF CROWN POINT, INDIANA.

FLEXIBLE METALLIC TIRE.

994,651.  Specification of Letters Patent.  Patented June 6, 1911.

Application filed September 29, 1910. Serial No. 584,429.

*To all whom it may concern:*

Be it known that I, WILLIAM C. NICHOLSON, a citizen of the United States, and a resident of Crown Point, in the county of Lake and State of Indiana, have made certain new and useful Improvements in Flexible Metallic Tires, of which the following is a specification.

My invention relates to improvements in flexible metallic tires for automobile or other wheels, and it consists in the combinations, constructions and arrangements herein described and claimed.

My invention is designed to take the place of the pneumatic tires now in common use, and to provide a tire made largely of metal which will have resiliency and durability, but which is not subject to the annoyance of puncture and other inconveniences arising from use of pneumatic tires.

A further object of my invention is to provide a metal tire having sections, each section being movable against springs so that as the wheel is rotated, the load comes successively upon the separate sections which give slightly, in the manner of the pneumatic tire.

A further object of my invention is to provide a tire composed of sections, each movable against springs, as explained, and provided with movable guide plates having slots for permitting the movement thereof.

Other objects and advantages will appear in the following specification and the novel features of the device will be particularly pointed out in the appended claims.

My invention is illustrated in the accompanying drawings forming part of this application, in which—

Figure 1 is a side elevation of a wheel showing one embodiment of my invention, broken away in parts. Fig. 2 is an enlarged section along the line 2—2 of Fig. 1, Fig. 3 is an enlarged section taken along the line 3—3 of Fig. 1, and Fig. 4 is a perspective view of the metallic rim for the felly showing the relation of the spring, the stationary side place and the movable guide plate.

In carrying out my invention, I make use of an ordinary wheel having a hub 1 to which are secured the spokes 2 which radiate therefrom. These spokes bear at their ends a wooden felly 3 which is provided with a metallic rim 4 like that shown in Fig. 4.

Referring now to Fig. 4, it will be seen that the rim 4 is provided with side slots $4^a$ at intervals, alternating with transverse lugs $4^c$, which are provided with slots $4^d$. Arranged to fit in the slots $4^d$ are the plates $5^a$ bearing the springs 5. These plates, as shown in Fig. 4, are preferably made integral with the springs, being secured thereto by rolling or in any other suitable manner. At the ends of the springs 5 are the eyes 6.

In Fig. 4 I have shown a plate 7. This plate is provided with two side notches $7^a$ arranged to fit over the shoulders $4^e$ at the ends of the slots $4^a$, the body of the plate fitting in the slot $4^a$. The plate 7 is provided with two extensions $7^b$ which are perforated at $7^c$. These extensions project inwardly into cut-away portions $3^a$ of the felly 3, so that the plates 7 lie flush with the sides of the felly. The bolts 8 are passed through the extensions $7^b$ and are secured by nuts 9 just underneath the inside of the felly as clearly shown in Figs. 1, 2 and 3. The upper ends of the plate 7 are provided with openings through which the reduced portions of bolts 10 are passed which thus firmly hold the plates 7 in position.

In Fig. 4 I have shown the slidable guide plates 11. These plates are provided with parallel slots $11^a$ and with the inclined slots $11^b$ and at the outer ends with the bolt holes $11^c$.

As will be seen from Fig. 1, the outer metallic rim consists of a series of curved sectional plates 12. These plates, as shown in Figs. 2 and 3, are provided with outwardly turned side flanges $12^a$ and inwardly turned side flanges $12^b$. The former are designed to receive the outer resilient tire 13, which in this instance I have shown as a solid rubber tire provided with stiffening wires 14. Secured between the flanges $12^b$ at the ends of adjacent sections 12 are links 15. These links are provided with end slots $15^a$ (see Fig. 1) through which the bolts 16 extend. These bolts carry sleeves 17 (see Fig. 3) which keep the links spaced apart in their proper position.

The plates 11 are secured to the outer flanges $12^a$ by means of bolts 18 which pass through the openings $11^c$, thus securely fastening the plate to the flange. The inner ends of the plates 11 lie next to the stationary plate 7 being loosely held in position by means of the strips 19 through which the reduced portions of the bolts 10 pass. It will be observed that these reduced portions also pass through the parallel slots 11ᵃ which, as will be explained later, affords the plate 11 a chance to move relatively to the plate 7 and to the strip 19.

The eyes 6 of the springs 5 register with the inclined slots 11ᵇ. Bolts 20 are provided, which pass through the eyes 6 and through slots 11ᵇ as clearly shown in Fig. 2.

From the foregoing description of the various parts of the device the operation thereof may be readily understood. As the wheel turns around, the part of the tire next to the ground receives the pressure. In Fig. 1 some of the parts have been removed in order to show the springs. It will be apparent that the section 12 will be pushed, by the resilient tire 13, inwardly. The slots 11ᵃ in the plate 11 will permit the plate to move inwardly relative to the stationary plate 7, and this inward movement will cause the plate 11 to bear on the ends of the springs 5. These ends have, however, a movement along the slots 11ᵇ. The bolts 16 at the ends of the section 12 will also have a slight movement along the slots 15ᵃ in the adjacent links 15. Since the sections 12 are all connected by the links 15 the pressure will be transmitted from one section to another, the bottom section, of course, taking the greater part of the strain. It will thus be apparent that as the wheel turns around, each section 12 will have a movement inwardly toward the hub and the wheel in precisely the same manner that the portions of the pneumatic tire would have. The resiliency of the springs 5 will, of course, restore these parts to their normal positions, when the wheel has turned to such a position that the pressure now comes upon some other part. The action of the wheel is, therefore, similar to that of a pneumatic tire due to the ability of the guide plate to move so that the pressure will be taken up by the springs. The wheel will at all times retain its rotundity due to the reaction of the springs when the wheel has turned to bring the pressure to another section, as described.

I claim:—

1. The combination with a wheel having a felly, of a metallic rim therefor provided with side slots and having lugs provided with transverse slots, a series of outwardly curved springs held in the slots in said lugs, a series of stationary plates disposed in the side slots and secured to the felly, a series of movable sections, slotted links pivotally securing said sections together, guide plates secured on each side of said sections and adapted to slide on the outside of said stationary plates, said guide plates being provided with inclined slots and with parallel slots, bolts passing through said inclined slots and through the ends of said curved springs, strips disposed outside of said guide plates, and bolts for holding said strips in position, said last mentioned bolts passing through the parallel slots.

2. The combination with a wheel having a felly, of a metallic rim therefor, a series of outwardly curved springs secured at their center portions to said rim, a series of stationary side plates carried by said felly between adjacent springs, a series of movable sections, slotted links pivotally connecting said sections, a guide plate secured on each side of each section, said guide plate being provided with inclined slots and parallel slots, means for securing the ends of said springs, said means passing through the inclined slots, side strips connected with said stationary plates, and means for holding said side strips, said means passing through the parallel slots of said guide plate.

WILLIAM C. NICHOLSON.

Witnesses:
JOSEPH B. YOUNG,
JOHN BROWN.